United States Patent [19]

Kim

[11] Patent Number: 5,077,682

[45] Date of Patent: Dec. 31, 1991

[54] APPARATUS AND METHOD FOR DISPLAYING DURATION OF A CALL MADE OVER A CENTRAL OFFICE LINE IN A KEYPHONE SYSTEM

[75] Inventor: Seog-Jun Kim, Seoul, Rep. of Korea

[73] Assignee: SamSung Electronics Co., Ltd., Suwon, Rep. of Korea

[21] Appl. No.: 404,561

[22] Filed: Sep. 8, 1989

[30] Foreign Application Priority Data

Dec. 31, 1988 [KR] Rep. of Korea ............... 1988-18078

[51] Int. Cl.⁵ ..................... G06F 15/20; H04M 15/28
[52] U.S. Cl. ........................ 364/569; 368/4; 364/464.01; 379/131; 379/140
[58] Field of Search ............. 364/569, 705.05, 705.06, 364/464.01, 464.04, 467; 368/4, 13; 379/13, 34, 96, 110, 116, 352, 457, 130, 131, 140

[56] References Cited

U.S. PATENT DOCUMENTS

| | | | |
|---|---|---|---|
| 3,136,114 | 6/1964 | Jauch | 368/13 |
| 3,512,355 | 5/1970 | Lang | 368/4 |
| 3,911,446 | 10/1975 | Albertini | 379/131 |
| 4,041,291 | 8/1977 | Pauda | 364/705.06 |
| 4,065,663 | 12/1977 | Edwards, II | 364/569 |
| 4,075,829 | 2/1978 | Goff | 368/4 |
| 4,079,201 | 3/1978 | Scott et al. | 368/13 |
| 4,161,626 | 7/1979 | Waldo | 379/131 |
| 4,168,525 | 9/1979 | Russell | 364/569 |
| 4,260,855 | 4/1981 | Rubinstein | 368/4 |
| 4,264,956 | 4/1981 | Delaney | 364/705.06 |
| 4,451,896 | 5/1984 | Pomerleau et al. | 364/569 |
| 4,473,718 | 9/1984 | Ettel | 368/4 |
| 4,602,347 | 7/1986 | Koyama | 364/569 |
| 4,656,657 | 4/1987 | Hunsicker | 379/131 |
| 4,748,574 | 5/1988 | Tuchto | 364/705.05 |
| 4,751,728 | 6/1988 | Treat | 379/131 |
| 4,813,065 | 3/1989 | Segala | 379/130 |
| 4,825,462 | 4/1989 | Lewiner et al. | 379/131 |
| 4,852,030 | 7/1989 | Munday | 364/569 |
| 4,920,556 | 4/1990 | Wong | 379/131 |
| 4,926,465 | 5/1990 | Kim | 379/131 |

OTHER PUBLICATIONS

"Telephone Timer"; Funkschall, vol. 47, No. 25 (12/75), pp. 89-90.

Primary Examiner—Kevin J. Teska
Attorney, Agent, or Firm—Robert E. Bushnell

[57] ABSTRACT

A method and apparatus for displaying duration of a call that is made over a central office line. The keyphone system having a plurality of keyphone subsets with displaying devices, for carrying out the invention, includes the steps of: notifying call-start by activating a call-duration start timer, if the call over the central office line is started, or, if not, checking whether or not the call is ended; checking whether or not the call-duration display is held, if the call is ended in the above step; checking sequentially whether or not a signal for activating call-duration start timer or call-duration increment timer are activated, if the call is not ended and a time key is not pressed; checking whether or not the central office line is held, if the signal for activating the call-duration start timer or call-duration increment timer is activated, and, if not held, sending call-duration data to a calling keyphone; and clearing a display of the call-duration and displaying a current time, if the time key is pressed and call-duration display is held in the checking step of the signal for activating call-duration start timer or call-duration increment timer.

8 Claims, 5 Drawing Sheets

APPARATUS AND METHOD FOR DISPLAYING DURATION OF A CALL MADE OVER A CENTRAL OFFICE LINE IN A KEYPHONE SYSTEM

BACKGROUND OF THE INVENTION

The present invention relates to a keyphone system, and specifically to a method of displaying duration of a call that is made over a central office line (hereinafter, referred to as "C.O. line").

In conventional keyphone systems, there exists a problem that a user is not able to know exactly how long he has been talking over the C.O. line and since the C.O. line does not provide a signal that specifies an exact time at which the other party on the other end of the C.O. line started to respond to his call, even though there are some keyphones with special functions capable of calling duration of a call made over a C.O. line, call-duration is displayed based on a system-defined time from which counting of the call-duration is started, so that an exact duration of the call that used the C.O. line cannot be known to its user.

SUMMARY OF THE INVENTION

Therefore, a purpose of the present invention is to provide a method of displaying the actual duration of a call for which the C.O. line is employed, by displaying the duration from a time at which a calling party presses a time key as soon as the other party starts to respond to the call when showing the call-duration through a display section of a keyphone during making a call to someone over the C.O. line in a keyphone system.

Another purpose of the present invention is to provide a method of checking call-duration on a display that shows when the time key is pressed a second time and the handset is hung up at the time the call is over.

According to an aspect of the invention, the inventive method includes the following operational steps of:
(a) if the call over the central office line is started, notifying call-start by activating a call-duration start timer, or if not, checking whether or not the call is ended;
(b) if the call has ended in the step (a), checking whether or not the call-duration display is held;
(c) if the call has not ended and a time key is not pressed, checking sequentially whether or not a signal for activating call-duration start timer or call-duration increment timer are activated;
(d) if the signal for activating the call-duration start timer or call-duration increment timer is activated, checking whether or not the central office line is held and, if not held, sending call-duration data to a calling keyphone; and
(e) if the time key is pressed and call-duration display is held in step (c), clearing a display of the call-duration and displaying a current time.

BRIEF DESCRIPTION OF THE ATTACHED DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENTS

Figure 1:
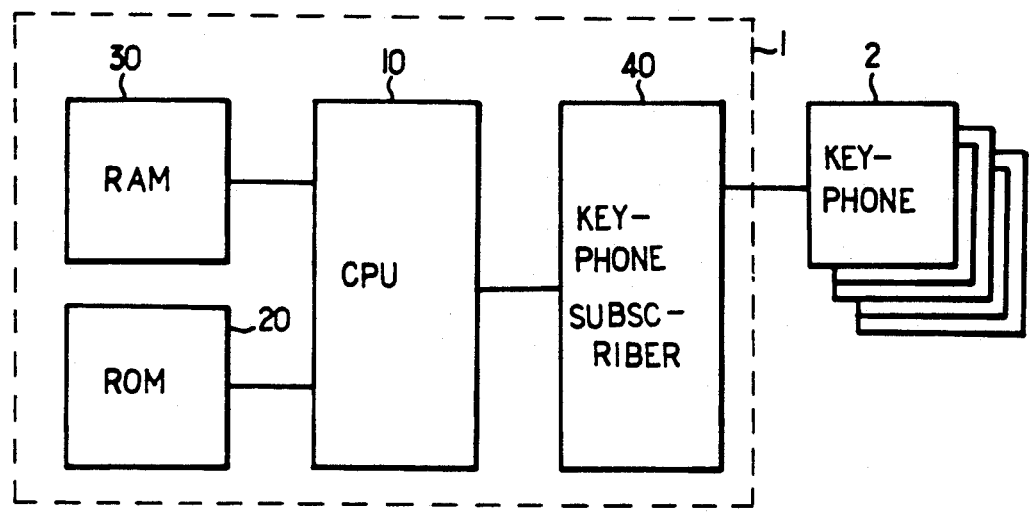
FIG. 1 is a system diagram according to the present invention.

Referring primarily to FIG. 1, it is a system diagram according to the present invention, in which a central processing unit(hereinafter, referred to as "CPU") 10 controls an entire keyphone system 1, a Read Only Memory (ROM) 20 stores program codes of the keyphone system 1 therein, a Random access memory (RAM) 30 stores data used in the keyphone system temporarily, a keyphone subscriber circuit 40 operates as an interface between a keyphone 2 that will be described later and the central processing unit (CPU), and the keyphone 2 has key LED(light emitting diode)'s and an LCD(liquid crystal display) and is terminal controlled by the central processing unit.

Figure 2:
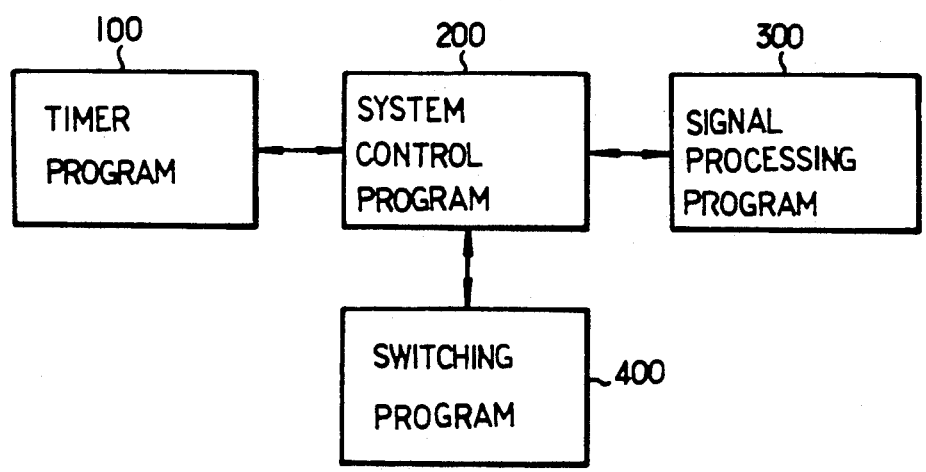
FIG. 2 is an operational block diagram of main program according to the present invention.

FIG. 2 is an operational block diagram of main programs according to the present invention, which includes: a timer program 100 that operates once a timer is activated and checks the timer every 100ms and sends a message to a switching program 400 that will be described hereinbelow; a system control program 200 that controls all programs of the keyphone system; a signal processing program 300 that exchanges data through the keyphone 2 and keyphone subscriber circuit 40 for interfacing; and the switching program 400 that performs an actual switching function and displays call-duration.

Figure 3A:
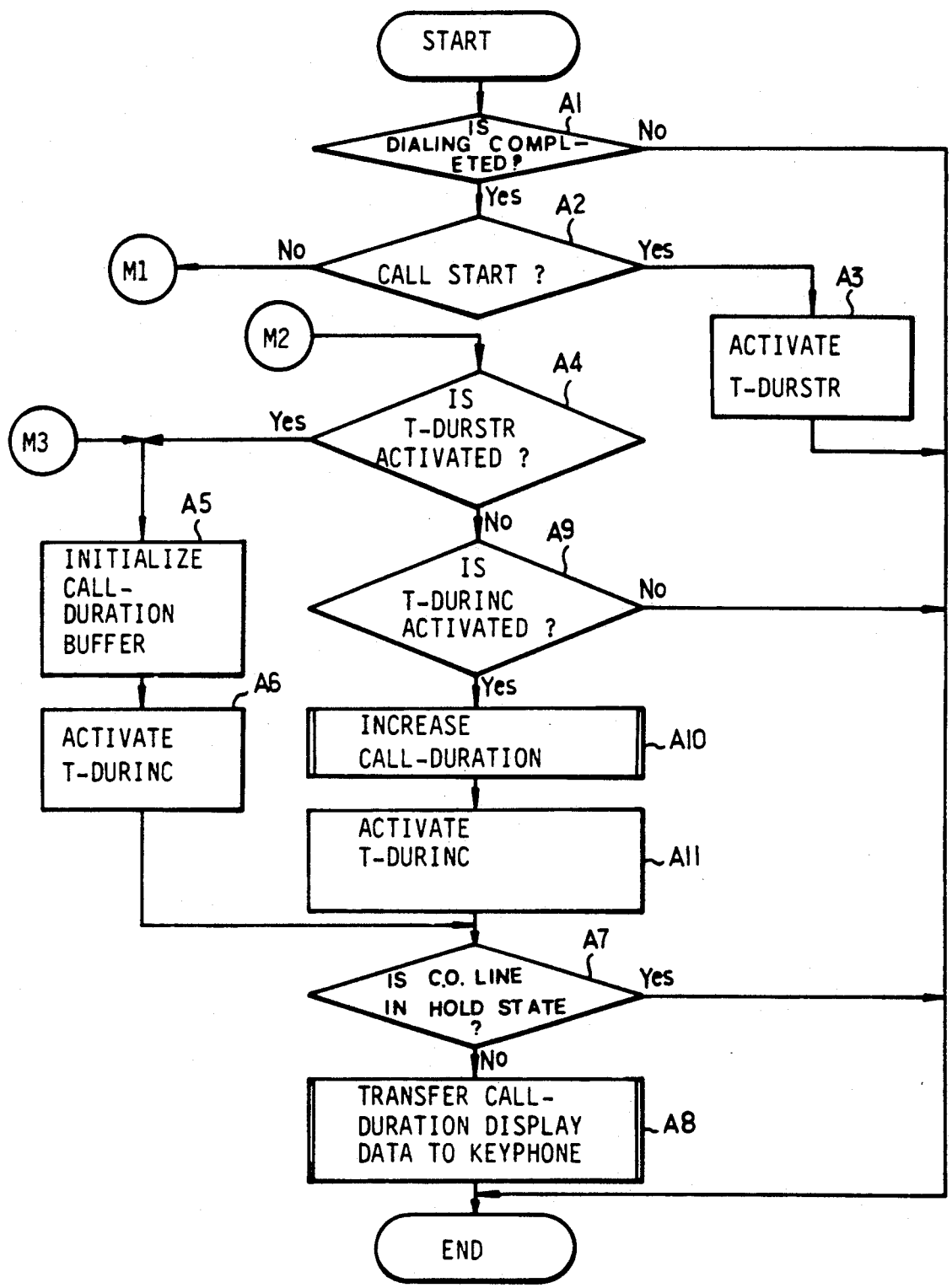
FIG. 3 (comprising FIGS. 3A and 3B) is a flow diagram displaying call-duration when the C.O. line is called.
Figure 3B:
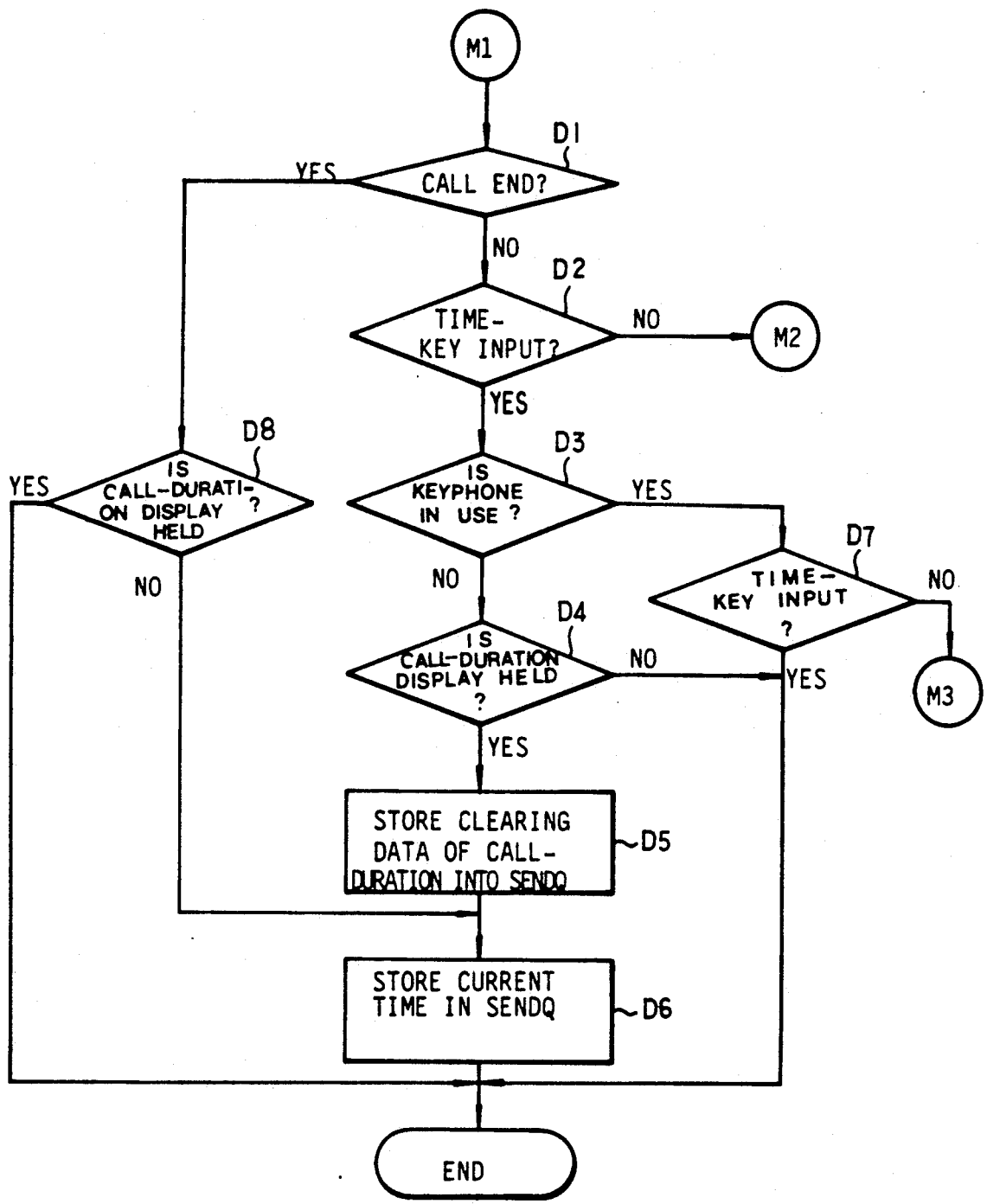

Now, referring further to FIG. 3, it is a flow diagram of displaying call-duration when the C.O. line is called. The diagram includes the following steps of:
(a) checking the C.O. line for starting a call and, if calling, the C.O. line is started, the the timer is activated and a call-start state is notified, but if the calling C.O. line is not started, whether or not the call is ended is checked;
(b) if the call is not ended, whether or not the time key is pressed is checked and if the call is over, whether or not display of call-duration is held is checked and if held, program is ended, but if not held, the current time that will be described later is displayed;
(c) whether or not the keyphone is being used is checked when the time key is pressed in step (b) and if not being used, then whether or not the display of call-duration is held is checked and if held, an existing display of a call-duration is cleared and the current time is displayed and the step is ended, but if the keyphone is being used, whether or not the time key is pressed is checked and if pressed, the step is ended when the time key is inputted;
(d) in step (a), if the time key is not pressed, whether or not a signal for a start timer for the call is inputted is checked and if the signal for activation of the start timer for the call is inputted or if key entry is not performed in step c, storage buffer for storing call-duration data is initialized and call-duration increment timer is activated;

(e) after the step (d) is executed, whether or not the C.O. line is held or not is checked and if held, this step is ended, but if not, call-duration data is generated and sent to the keyphone;

(f) if entered data is not a signal for starting the timer that counts call-duration in the step (c), the data is checked again to see if it is a signal for starting the timer to count increments in call-duration and if it is, increments in call-duration is stored and the timer to count increments in call-duration is activated and the step (e) is started.

Figure 4:
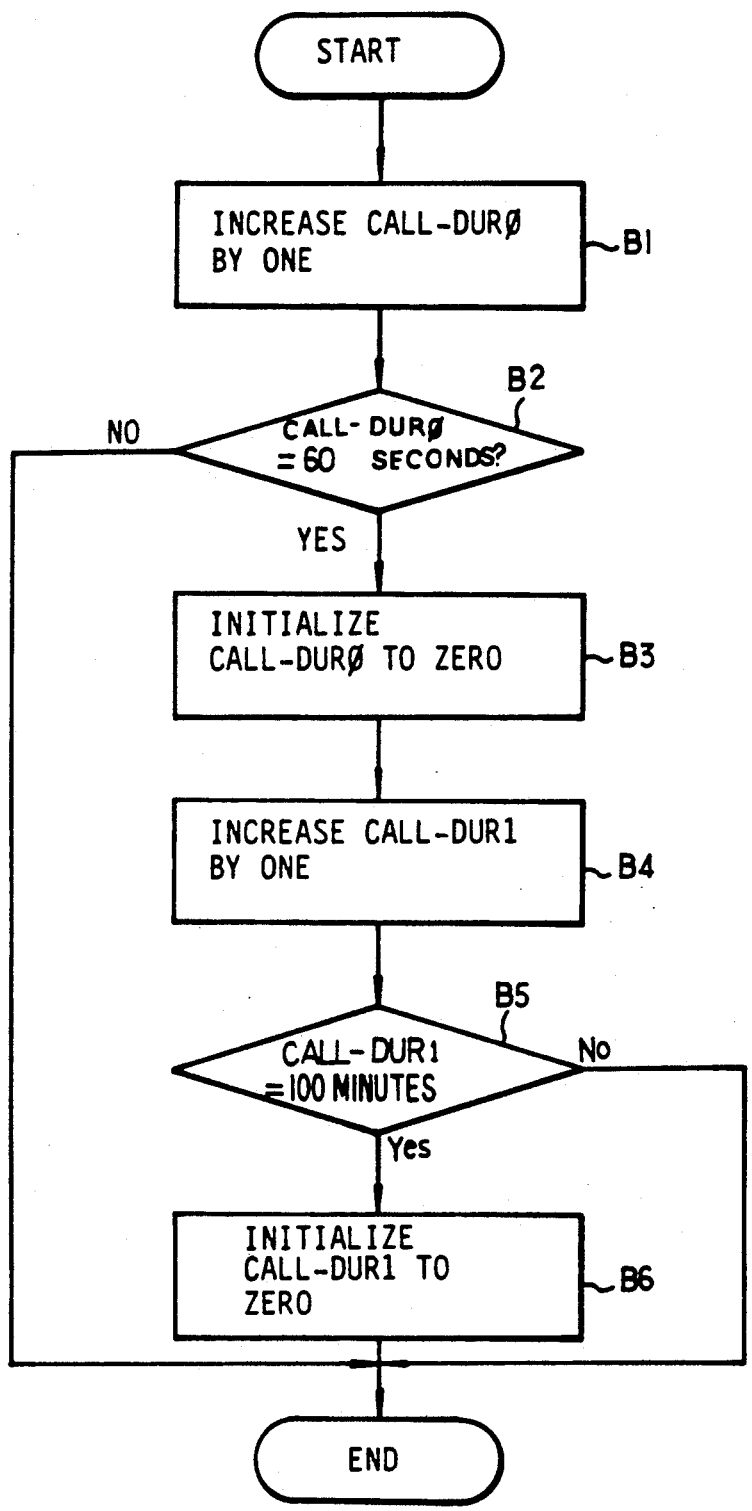
FIG. 4 is a flow diagram of time-count increase in a buffer that stores data of call-duration increment in FIG. 3.
Figure 5:
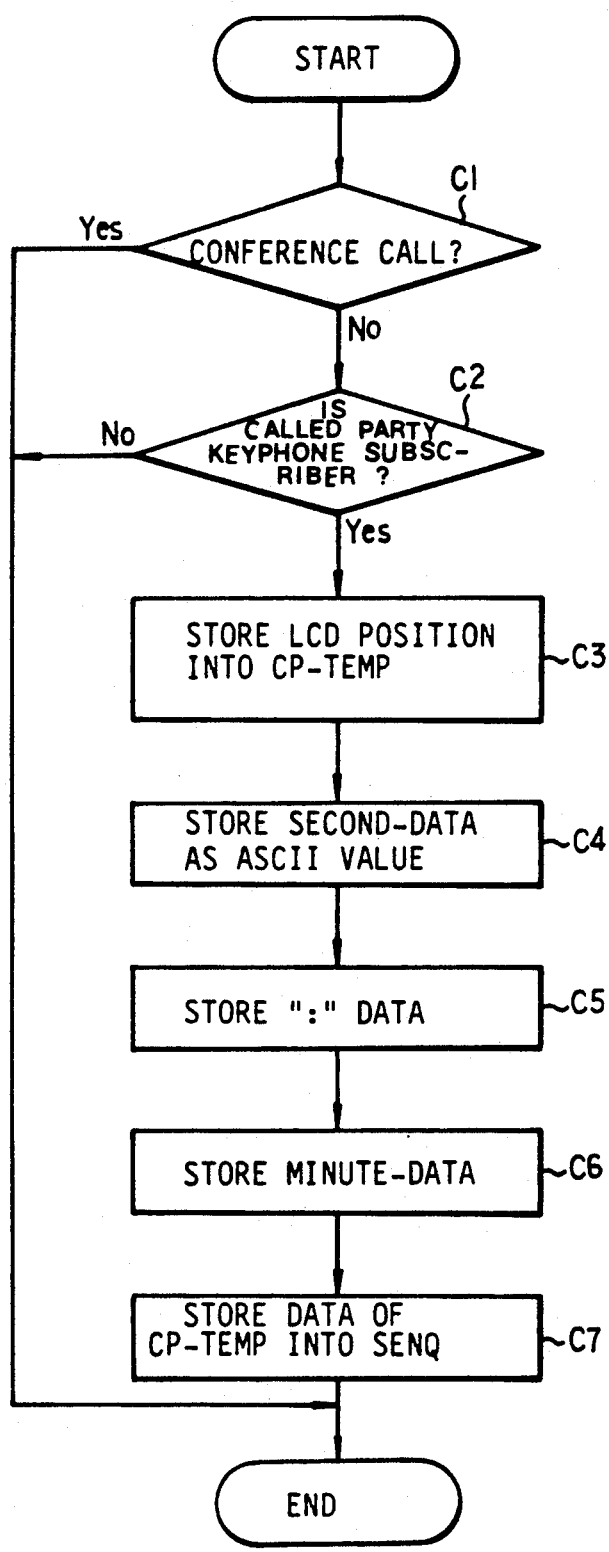
FIG. 5 is a flow diagram of data for displaying call-duration in FIG. 3.

Meanwhile, FIG. 4 illustrates a flow diagram of count increments in a buffer that stores data of increments in call-duration in FIG. 3, and FIG. 5 shows a flow diagram of data for displaying call-duration in FIG. 3.

Hereinafter, the preferred embodiments of present invention is described in detail with reference to the FIGS. 1 through 5.

First, the CPU 10 exchanges data with the keyphone 2, which is a terminal, and performs transmission and reception of diversity of signals and voice data through the keyphone subscriber circuit 40.

Once a call started to the keyphone 2 over the C.O. line, the CPU 10 recognizes the call, activates the timer, stores the timer in a buffer of the RAM 30, and then in specified intervals generates data for displaying call-duration and sends the data to the keyphone 2.

According to the preferred embodiment of the present invention, the data for displaying call-duration is sent to the keyphone 2, which is a terminal equipped with a liquid crystal display (LCD).

According to the operational description, when a call is performed over the C.O. line through the keyphone 2 that is a terminal, a flow of the displaying call-duration according to the present invention proceeds as follows: when the keyphone 2 is hooked off and a dialing is made over the C.O. line (for a local call, a long distance call, international call, etc.), the CPU 10 checks in a step A1 of FIG. 3 whether or not dialing over the C.O. line is completed.

Thereafter, when the dialing over the C.O. line is completed in step A1, a step A2 is proceeded and whether or not a telephone call over the C.O. line is started is checked and if started, a corresponding message is registered in a timer message queue (TMSGQ) in a step A3 to activate a call-duration start timer (T-DURSTR) for counting a call-duration, and a flag for starting activation of the timer is set and the step A3 is completed.

If a telephone conversation over the C.O. line is not started in step A2, whether or not a handset is hung up is checked as the call is ended, and if hung up, a step D8 is performed. In the step D8, whether or not display of call-duration is currently held is checked and if held, processing is ended, but if not, data for displaying a current time is stored in a send queue (SENDQ) in a step D6.

However, if the telephone conversation is not ended in the step D1, then, in a step D2 whether or not a time key is pressed is checked and if not pressed, a step A4 is performed, but if pressed, then whether or not the keyphone 2 is currently being used is checked in a step D3. If the keyphone 2 is currently being used, then in a step D7 whether or not the time key has been pressed is checked and if already pressed, processing is ended to hold the current display call-duration, but if not pressed yet, a step A5 is performed.

If the keyphone 2 is not being used in said step D3, a step D4 is performed to check whether or not the display of call-duration is held and if held, then in a step D5, data for clearing the display of call-duration is stored in the send queue(SENDQ) and the step D6 is performed, but if not held, then step D5 is not performed. In said step D5, a first call-duration buffer (CALL-DUR1) of a dynamic line control block (DLCB) in the RAM 30 is initialized to a value of "0" (zero) and in a step A6 the call-duration increment timer (T-DURINC) is activated.

Above said dynamic line control block (DLCB) is a table in which all states of a subscribers of the keyphone system are stored and given to every subscriber of said keyphone system; in the table, there are two call duration storage buffers for storing duration of a call made over the C.O. line, and herein, of the two buffers, the first call-duration buffer (CALL-DUR1) stores minutes and a second call-duration buffer (CALL-DUR0) stores seconds.

In addition, if the call duration timers are "on" state, time is decreased in the timer program 100 in every 100ms for every increment of one second and when the time becomes "0"(zero), timer value is handed over to the switching program 400 by the system control program 200.

After step A6, whether or not the C.O. line is held is checked in a step A7 and if held, processing is ended without transmitting data about call duration of the keyphone 2. That is, even if the C. 0. line is held, the data about duration of the call made over C.O. line is continuously accumulated but not transmitted to the keyphone 2, and only when the hold state of the C.O. line is released, the data accumulated during the hold state is sent all together. But if the C.O. line is not held in step A7, call-duration display data is generated and sent to the keyphone 2 in a step A8 as will be described in FIG. 5.

On the other hand, the CPU 10 checks, in a step C1, whether or not a specified subscriber is involved in a conference call and if conference call, the CPU 10 ends operation without sending call-start display data to the appropriate subscriber, but if not conference call, proceeds to a step C2 and checks whether or not the called party is a subscriber of the keyphone system. Then, in the step C2 as well, if the called party is not a subscriber of the keyphone system, call-duration display data is not transmitted and the step is ended, but if not involved in a conference call, display position value of the keyphone 2 is stored, in a step C3, in a call processing temporary buffer CP-TEMP of the RAM 30 that is temporarily used by the switching program 400. In a step C4, data with unit of second is stored as ASCII (American Standard Code for International Interchange) value in a buffer next to the buffer CP-TEMP and a step C5 is performed. In step C5, ":" data is stored, in a step C6, data with unit of minutes stored and a step C7 is performed. In step C7, a value stored in the buffer CP-TEMP is stored in the send queue SENDQ of RAM 30 to be sent to the keyphone 2 by the signal processing program 300 and the step is ended. The send queue (SENDQ) is a queue which stores data that will be sent to the keyphone 2 and the data stored in the send queue (SENDQ) is sent to the keyphone 2 by the signal processing program 300 that is performed every 10 ms to be displayed on the LCD as current duration of a call made over C.O. line.

Referring back to FIG. 3, if a call-duration start timer (T-DURSTR) is not activated in step A4, whether or not a call-duration increment timer (T-DURINC) is activated is checked in a step A9. And if the call-duration increment timer is not activated, this processing is ended, but if activated, a step A10 proceeds and a flow is performed as in FIG. 4; herein, as the call-duration increment timer is activated every second, a value stored in the "second" storage buffer (CALL-DUR0) is increased by 1 in a step B1, whether or not the value has reached 60 seconds (i.e., one minute) is checked, and then if the value is less than minute, the processing is ended. But if the value reaches 1 minute in step B2, the "second" storage buffer (CALL-DUR0) is initialized to 0 in a step B3, and a value in the "minute" storage buffer (CALL-DUR1) is increased by 1 in a step B4 and then a step B5 performed. In step B5, whether or not 100 minutes is reached is checked and if not reached, this processing is ended, but if reached, a step B6 is proceeded and this processing is ended after the "minute" storage buffer (CALL-DUR1) is initialized to 0.

Therefore, the step A10 is performed to increase call-duration as described above, a step A11 is proceeded and call-duration increment timer (T-DURINC) is activated for a next state, and then the step A7 is proceeded; thereby, whether or not the C.O. line is held or not is checked as explained hereinabove.

As described in the foregoing description, the present invention presents such advantages that when a subscriber of a keyphone makes a call over the C.O. line, the subscriber can be noticed an exact call-duration time, at which the call was started, by pressing the time key right at the point when a called party lifts handset, and as soon as the call is over the calling party can make sure duration of his call through holding display of the call-duration by pressing the time key again and hanging up the handset; thus, the calling party shall pay less for his call by controlling the duration of his call and at the overall system's point of view, more efficient and cost-saving use of the C.O. line is realized.

Although specific constructions and procedures of the invention have been illustrated and described herein, it is not intended that the invention be limited to the elements and constructions disclosed. One skilled in the art will easily recognize that the particular elements or subconstructions may be used without departing from the scope and spirit of the invention.

What is claimed is:

1. A method of displaying duration of a call made over a central office line in a keyphone system having a plurality of keyphones with displaying means, the method comprising the steps of:
   (a) activating a call-duration start timer for indicating starting of a call upon the call being started, and then checking whether or not the call is ended;
   (b) if the call is ended in the step, checking whether or not a call-duration time indicated on said displaying means is at a standstill;
   (c) if the call is not ended in said step (a) and a time key is not depressed, checking whether or not a control signal for activating said call-duration start timer or a call-duration timer is applied thereto, said call-duration timer being for counting duration of said call and generating a call-duration time;
   (d) checking whether or not the central office line is at a holding state in response to said control signal and, if not at said holding state, sending a value of said call-duration time to said keyphone to display the call-duration time on a said display means; and
   (e) if said time key is depressed and said call-duration time indicated on said display means is at a standstill in said step (b), clearing the call-duration time displayed on said display means to display a current time.

2. The method according to claim 1, wherein said step (c) further comprises the steps of:
   initializing a call-duration storage buffer to activate said call-duration timer in response to said control signal; and
   increasing the call-duration time of said call-duration timer in response to said control signal.

3. A method of displaying duration of a call made over a central office line in a keyphone system having at least one keyphone with a time key and displaying means, the method comprising the steps of:
   (a) determining whether or not dialing over said central office line is completed;
   (b) recognizing whether or not a call has been started when said dialing is determined to have been completed;
   (c) activating a call-duration start timer for indicating starting of said call upon recognizing the call has been started or checking whether or not the call has ended if a call is not recognized as being started;
   (d) if it has been determined that the call has been ended in said step, checking whether or not a call-duration time indicated on said displaying means is at a standstill;
   (e) if it has been determined that the call is not ended in said step (c), checking whether or not said time key is depressed;
   (f) if said time key is determined to not have been depressed in step (e), checking whether or not said call-duration start timer is activated;
   (g) if said call-duration start timer is determined not to have been activated in said step (f), checking whether or not a call-duration incrementing timer, for counting duration of said call and generating a call-duration time, is activated;
   (h) if said call-duration incrementing timer is determined to have been activated in said step (g), increasing a stored value indicative of a call duration, activating said call-duration incrementing timer after a second has passed and checking whether or not the central office line is in a holding state and, if not in said holding state, sending a value of said call-duration time to said keyphone to display the call-duration time on said display means;
   (i) if said time key is determined to have been depressed in step (e), checking if said call-duration time indicated on said display means is at a standstill; and
   (j) clearing the call-duration time displayed on said display means to display a current time if said call-duration time indicated on said display means is determined to be at a standstill in said step (i).

4. The method according to claim 3, wherein said step (f) further comprises the steps of:
   initializing a call-duration storage buffer to activate said call-duration incrementing timer if said call-duration start timer is determined not to have been activated; and
   increasing the call-duration time of said call-duration timer.

5. The method according to claim 3, wherein said step (h) further comprises the steps of:
increasing said call-duration incrementing timer every second;
increase a value stored in a "seconds" storage buffer by one;
initializing said "seconds" storage buffer to a value of zero if said value stored in said "seconds" buffer equals sixty seconds and increasing a value stored in a "minutes" buffer by 1; and
initializing said "minutes" buffer to a value of zero if said value stored in said 'minutes' buffer equals one hundred minutes.

6. An apparatus for displaying duration of a call made over a central office line in a keyphone system, having at least one keyphone with a time key and displaying means, comprising:
a random access memory for temporarily storing data;
a read only memory for storing program codes;
a keyphone subscriber circuit for interfacing between said keyphone and a central processing unit;
a call-duration start timer in said central processing unit for indicating starting of a call; and
a call-duration increment timer in said central processing unit for counting duration of said call and generating a call-duration time;
wherein said central processing unit determines whether or not dialing from said keyphone over said central office line is completed,
recognizes whether or not a call has been started when said dialing is determined to have been completed,
activates said call-duration start timer upon recognizing the call has been started or checking whether or not the call has ended if a call is not recognized as being started,
checks whether or not a call-duration time displayed on said displaying means is at a standstill if it has been determined that the call has been ended,
checks whether or not said time key is depressed if it has been determined that the call is not ended,
checks whether or not said call-duration start timer is activated if said time key is determined to not have been depressed,
checks whether or not said call-duration incrementing timer is activated if said call-duration start timer is determined not to have been activated,
increases a value stored in a first buffer indicative of a call duration, if said call-duration incrementing timer is determined to have been activated, activates said call-duration incrementing timer after a second has passed and checks whether or not the central office line is in a holding state, and if not in said holding state, sending a value of said call-duration time to said keyphone via said keyphone subscriber circuit to display the call-duration time of said display means,
checks if said call-duration time indicated on said display means is at a standstill if said time key is determined to have been depressed, and
clears the call-duration time displayed on said display means to display a current time if said call-duration time indicated on said display means is determined to be at a standstill.

7. The apparatus according to claim 6, wherein said central processing unit further initializes a call-duration storage buffer to activate said call-duration incrementing timer if said call-duration start timer is determined not to have been activated, and
increases the call-duration time of said call-duration timer.

8. The apparatus according to claim 7, wherein said central processing unit further increasing said call-duration incrementing timer every second,
increases a value stored in a "seconds" storage buffer by one,
initializes said "seconds" storage buffer to a value of zero if said value stored in said "seconds" buffer equals sixty seconds and increasing a value stored in a "minutes" buffer by 1, and
initializes said "minutes" buffer to a value of zero if said value stored in said 'minutes' buffer equals one hundred minutes.

* * * * *

UNITED STATES PATENT AND TRADEMARK OFFICE
CERTIFICATE OF CORRECTION

PATENT NO. : 5,077,682

DATED : 31 December 1991

INVENTOR(S) : Seog-Jun KIM

It is certified that error appears in the above-identified patent and that said Letters Patent is hereby corrected as shown below:

Column 2, Line 15, replace "Read Only" with --read only--;

Line 16, replace "Memory" with --memory--;

Line 17, replace "Random" with --random--;

Line 22, replace "LED" with --LED's--, and replace "diode)'s" with --diode)--;

Line 42, delete "the" (second occurrence);

Column 3, Line 18, delete "the";

Line 24, insert --is-- after "call";

Line 43, replace "is proceeded" with --begins--;

Column 4, Line 13, delete "a";

Line 21, insert --in an-- after "are";

Line 31, insert --the-- after "over";

Line 41, insert --involved in a-- after "if";

Line 43, insert --involved in a-- after "not";

Line 53, replace "unit of second" with --units of seconds--.

UNITED STATES PATENT AND TRADEMARK OFFICE
CERTIFICATE OF CORRECTION

PATENT NO. : 5,077,682

DATED : 31 December 1991

INVENTOR(S) : Seog-Jun KIM

It is certified that error appears in the above-identified patent and that said Letters Patent is hereby corrected as shown below:

Column 4, Line 56, delete """:""";

Column 5, Line 12, insert --one-- after "than";

Line 13, replace "1" with --one--;

Line 19 and 20, replace "is proceeded" with --begins--;

Line 23, replace "is proceeded" with --begins--;

Line 24, insert --the-- after "and";

Line 25, replace "is proceeded" with --begins--;

Line 31, replace "be noticed" with --view--;

Line 33, insert --the-- after "lifts";

Line 35, insert --of the -- after "sure".

IN THE CLAIMS

Claim 1, Column 5, Line 59, insert --(a)-- after "step";

UNITED STATES PATENT AND TRADEMARK OFFICE
CERTIFICATE OF CORRECTION

PATENT NO. : 5,077,682

DATED : 31 December 1991

INVENTOR(S) : Seog-Jun KIM

It is certified that error appears in the above-identified patent and that said Letters Patent is hereby corrected as shown below:

Claim 3, Column 6, Line 30, insert --(c)-- after "step".

Signed and Sealed this

Twenty-seventh Day of April, 1993

Attest:

MICHAEL K. KIRK

*Attesting Officer*    *Acting Commissioner of Patents and Trademarks*